US011951073B2

(12) United States Patent
Gaillot et al.

(10) Patent No.: US 11,951,073 B2
(45) Date of Patent: Apr. 9, 2024

(54) DEVICE FOR TRANSFERRING A LIQUID FROM A FIRST VIAL TO A SECOND VIAL

(71) Applicant: HOFFMANN-LA ROCHE INC., Little Falls, NJ (US)

(72) Inventors: Maxime Gaillot, Basel (CH); Roberta Leah, Basel (CH); Declan Reilly, Basel (CH); Thomas Thueer, Basel (CH); Jack Carroll, Bristol (GB); James Coop, Bristol (GB); Edward Sims, Bristol (GB); Mark Teucher, Bath (GB)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 325 days.

(21) Appl. No.: 16/760,514

(22) PCT Filed: Nov. 2, 2018

(86) PCT No.: PCT/EP2018/079985
§ 371 (c)(1),
(2) Date: Apr. 30, 2020

(87) PCT Pub. No.: WO2019/086595
PCT Pub. Date: May 9, 2019

(65) Prior Publication Data

US 2021/0196571 A1 Jul. 1, 2021

(30) Foreign Application Priority Data

Nov. 2, 2017 (EP) .................................... 17199752

(51) Int. Cl.
*A61J 1/20* (2006.01)
*A61J 1/14* (2023.01)

(52) U.S. Cl.
CPC ........... *A61J 1/2048* (2015.05); *A61J 1/1406* (2013.01); *A61J 1/2013* (2015.05); *A61J 1/2037* (2015.05); *A61J 1/2082* (2015.05); *A61J 1/2089* (2013.01)

(58) Field of Classification Search
CPC ...... A61J 1/1406; A61J 1/2048; A61J 1/2013; A61J 1/2006; A61J 1/2017; A61J 1/2037;
(Continued)

(56) References Cited

U.S. PATENT DOCUMENTS 2,954,769 A * 10/1960 Callahan ............... A61J 1/2089 141/330
4,543,101 A * 9/1985 Crouch ................. A61J 1/2096 604/86
(Continued)

FOREIGN PATENT DOCUMENTS

EP 2 351 549 A1 8/2011
EP 2 842 540 A1 3/2015
(Continued)

OTHER PUBLICATIONS

International Search Report dated Oct. 12, 2018 in International Application No. PCT/EP2018/079985.
(Continued)

*Primary Examiner* — Leslie A Lopez
*Assistant Examiner* — Seth Han
(74) *Attorney, Agent, or Firm* — MEDLER FERRO WOODHOUSE & MILLS PLLC

(57) ABSTRACT

A device for transferring a liquid from a first vial to a second vial is disclosed having a dome portion configured to create an air flow when activated by compression and re-expansion, and a support body tightly supporting the dome portion to form a chamber with air therein. The support body includes first and second vial seats, and a transfer conduit. The first and second vial seats are arranged to receive the first and second vials. When the first and second vials are received in the first and second vial seats, the transfer conduit is arranged to establish a fluid connection between the first vial and the second vial. Upon activation of the
(Continued)

dome portion, air is delivered into the first vial, thereby creating a pressure rise in the first vial which causes the liquid to transfer from the first vial to the second vial through the transfer conduit.

11 Claims, 5 Drawing Sheets

(58) Field of Classification Search
CPC ...... A61J 1/2082; A61J 1/2089; A61J 1/2072; A61F 9/0008
See application file for complete search history.

(56) References Cited

U.S. PATENT DOCUMENTS

| | | | | |
|---|---|---|---|---|
| 2008/0269680 | A1 | 10/2008 | Ibranyan et al. | |
| 2009/0099547 | A1* | 4/2009 | Radmer | A61J 1/2089 604/82 |
| 2011/0175347 | A1* | 7/2011 | Okiyama | A61J 1/2089 285/132.1 |
| 2015/0083950 | A1* | 3/2015 | Okiyama | A61J 1/2082 251/148 |
| 2015/0190311 | A1* | 7/2015 | Sund | A61J 1/1406 604/414 |

FOREIGN PATENT DOCUMENTS

| | | | | |
|---|---|---|---|---|
| JP | S58-51733 | U | | 4/1983 |
| JP | 2008-6066 | A | | 1/2008 |
| JP | 2008006066 | A | * | 1/2008 |
| WO | 2009146088 | A1 | | 12/2009 |
| WO | 2011071952 | A2 | | 6/2011 |

OTHER PUBLICATIONS

Japanese Office Action issued in corresponding Japanese Patent Application No. 2020-524346 dated Aug. 26, 2022.

* cited by examiner

DEVICE FOR TRANSFERRING A LIQUID FROM A FIRST VIAL TO A SECOND VIAL

TECHNICAL FIELD

The present invention relates to a device for transferring a liquid from a first vial to a second vial and, more particularly, to a device that, by creating an air flow, transfers the liquid from the first vial to the second vial for revising the liquid volume, reconstitution or composition of a drug product to be delivered to a patient.

Such transfer device can be used for efficiently and promptly transferring a liquid, employed as a re-hydrating or diluent solution or as a drug component, from a first vial where it is preliminarily contained to a second vial where a medicament component or constituent needs to be re-hydrated or diluted or combined and mixed for proper application. The transfer device according to the present invention can also be employed for the preparation by mixing of a medicament, wherein the amount of liquid employed as a re-hydrating or diluent solution or as a drug component can be precisely dosed by actively pumping a desired quantity thereof.

BACKGROUND ART

Injectable medicaments, or drugs, for intravenous delivery to a patient are sometimes packaged, stored and distributed in a concentrated or dehydrated state, such as, for instance, a concentrated liquid or a freeze-dried powder. Before these concentrated or dehydrated medicaments are suitable for administration to patients, they are to be reconstituted. Typically, the reconstitution process involves mixing a liquid rehydration or dilution component with a dehydrated, lyophilized or concentrated liquid medicament component. Only then the reconstituted medicament, i.e. a drug product, can be administered to a patient. This is a common practice, for instance, with many types of chemotherapy preparations.

Generally, the concentrated liquid or the powder are packaged separately from the diluent solution or from the liquid re-hydration component. The reasons for this are manifold and include the following:

- a pre-mixed combination of concentrated liquid or powder respectively with a diluent solution or a re-hydrating liquid is not chemically and/or physically stable and would yield a medicament product with reduced shelf-life;
- the concentrated or dehydrated medicament is manufactured separately and/or on different sites with respect to the diluent solution or the re-hydrating liquid.

Analogous considerations can apply to medicaments which, more in general, become active only when at least two main different components thereof are mixed, wherein at least one of the components is liquid.

Often, in medical applications, the involved substances such as the medicament or the active pharmaceutical ingredient and the reconstitution medium are provided in vials. For example, in medical applications involving injection, the substances are typically provided in vials wherein such vials are covered by a pierceable cover such as, e.g., a septum. Before delivery, it is known to use a syringe for transferring the substance of one vial to the other vial for preparing the medicament. However, such transfer by syringe has many disadvantages since it relies on a proper handling and is therefore dependent on the skills of the user. For example, such syringe transfer can be disadvantageous with regard to accuracy.

For, preventing such disadvantages, there are devices on the market which somehow enable transferring a liquid from one vial to another vial so that a medicament can be reconstituted or made active and suitable for injection.

Also, known transfer devices rely primarily on passive transfer principles, such as an underpressure preventively obtained when manufacturing a vial. Typically, an underpressure is created in a lyophilized vial (i.e. in a vial with lyophilized filling), so that when a vial with liquid is attached to a conventional transfer device, the liquid will transfer from this vial into the vial holding the lyophilisate passively by way of pressure equilibration. This does not allow an application or patient specific accurate dosage of the liquid transferred. Current transfer devices are also not suitable to achieve a controlled liquid transfer between two precision vials.

Therefore, there is a need for a transfer device allowing an accurate transfer of a desired amount of a liquid from a first vial to a second vial, which concurrently guarantees sterility and fluid tightness.

DISCLOSURE OF THE INVENTION

According to the invention this need is settled by a device for transferring a liquid from a first vial to a second vial as it is defined by the features of independent claim 1, as well as by a transfer device system as defined by the features of independent claim 20. Preferred embodiments are subject of the dependent claims.

In particular, the invention deals with a device for transferring a liquid from a first vial to a second vial, comprising a resilient or elastic dome portion and a support body tightly supporting the dome portion. The dome portion is configured to create an air flow when activated by compression and re-expansion, for instance by a finger of an operator. The support body forms a chamber comprising air for the air flow. Thus, the air contained in the chamber can be used for creating the air flow by activation of the dome portion.

In context with the invention, the term “vial” can relate to a vial in the literal sense, i.e. a comparably small vessel or bottle, often used to store pharmaceutical products or drug products in liquid, powdered or capsuled form. The vial can be made of a sterilisable material such as glass or plastic such as, e.g., polypropylene. It typically comprises a cover or cap including a sealing such as a rubber stopper or a septum which for many applications is designed to be pierced.

The term “drug” can relate to a therapeutically active substance, also commonly called active pharmaceutical ingredient (API), as well as to a plurality of such therapeutically active substances. The term also encompasses diagnostic or imaging agents, like for example contrast agents (e.g. MRI contrast agents), tracers (e.g. PET tracers) and hormones, that need to be administered in liquid form to the patient.

The term “drug product” as used herein relates to a drug as defined above formulated or reconstituted in a form that is suitable for administration to the patient. A particularly preferred drug product can be a drug solution, in particular a solution for body opening administration, injection or infusion. The liquid generated in the second vial by the device can particularly be such a drug product.

The support body of the device according to the invention comprises a first vial seat, a second vial seat and a transfer conduit. The first vial seat of the support body is arranged to receive the first vial, whereas the second vial seat of the support body is arranged to receive the second vial. Each of the vial seats can therefore be configured to engage and hold in position the respective vial.

When the first vial is received in the first vial seat and the second vial is received in the second vial seat, the transfer conduit is arranged to establish a fluid connection between the first vial and the second vial. Thereby, on or upon activation of the dome portion, air is delivered into the first vial by the air flow such that a pressure rise is created in the first vial which causes the liquid to be transferred from the first vial to the second vial through the transfer conduit.

The term "fluid" as used herein relates to a substance that more or less continually deforms, i.e. flows, under an applied shear stress. A fluid may be a liquid such as the drug product, a gas such as air, a plasma and, to some extent, solids compositions. In the context of the invention, the term fluid is typically used in connection with the liquid drug product and the air or other gas inside the chamber and the vial.

The term "activation" as used herein can relate to bringing the dome portion in a deformed shape, i.e. to deforming the dome portion, and to bringing the dome back in its original shape. For example, bringing the dome portion in a deformed shape can be achieved by compressing or pushing it, such as compressing it with a finger. Bringing the dome portion back in its original shape can be achieved, for example, by releasing the dome portion such that resiliency or elasticity of the material of the dome portion re-expands it to the original shape.

In one possible embodiment of the device, the transfer conduit connects the first vial, the second vial and the chamber, when the first and second vials are received in their respective vial seats, such that the first vial, the second vial and the chamber are in fluid communication. In operation of this embodiment, compressing the dome portion within activation can result in a transfer of air into the first and second vials such that the two vials are pressurized. When releasing and thereby resiliency induced re-expanding the dome portion within activation, the overpressure can be equalized by drawing liquid from the first vial and air from second vial into the chamber. Each subsequent compression pressurises the first and second vials by forcing air from the chamber into the first vial and by forcing liquid from the chamber into the second vial. Each subsequent release equalizes the pressure in the vials by drawing liquid from the first vial and air from the second vial.

In another possible embodiment, the transfer device comprises a liquid proof or liquid tight and air permeable wall member, wherein the transfer conduit connects the first vial and the second vial, and the wall member separates the chamber from the transfer conduit. A preferred arrangement of such a wall member can be in the form of a filter member as described below. In operation of this other possible embodiment, compressing the dome portion within activation can result in a transfer of air into the first and second vials through the wall member and via the transfer conduit such that the two vials are pressurized. When releasing and thereby resiliency induced re-expanding the dome portion within activation, the overpressure can be equalized by drawing liquid from the first vial and air from second vial. Thereby, the air can pass the wall member such that it is transferred into the chamber. In contrast, the liquid from the first vial cannot pass the wall member such that it is transferred from the first vial into the second vial via the transfer conduit.

In the context of the present invention, air can be substituted with any gas or gas mixture suitable to produce an equivalent corresponding gaseous flow on, or upon, activation of the resilient dome portion by compression and re-expansion.

By providing the vial seats and the transfer conduit, the transfer device according to the invention allows for a seal arrangement such that the liquid can be tightly transferred. Additionally, particularly the dome portion allows for an active transfer of the liquid from the first to the second vial by activation, such as by pumping, such that the liquid can accurately and/or completely be transferred. Thus, the device may allow an accurate transfer of a desired amount of a liquid or of all liquid from the first vial to the second vial under sterile and fluid tight conditions.

Furthermore, the device according to the invention can be manufactured in a comparably cost efficient manner. For example, standard manufacturing technology such as injection molding can be used for manufacture. Also, the device can be composed of comparably few parts or pieces. For example, it can be composed of two parts, i.e., the dome portion of a comparably resilient or elastic deformable material and the support portion of a comparably rigid material. Preferably, the dome portion is made of silicone or of some similar compliant, flexible elastomeric material. It may be a moulded silicone part which can easily come back to its original moulded shape after deformation by compression. The support body made of a more rigid material than the dome portion to better support to the deformable dome portion can be injection moulded of a thermoplastic polymer. The support body can be injection-moulded, for instance, of a thermoplastic polymer.

Preferably, the transfer conduit comprises end sections each embodied as puncturing members protruding the vial seats and arranged to establish flow pathways to and/or from an interior of the vials, i.e. to and/or from an interior of the first vial through a pierceable cover thereof, and to and/or from an interior of the second vial through a pierceable cover thereof. The puncturing member can particularly be embodied as a spike or a needle section. Such puncturing member allows for assuring an efficient and safe access to the interior of the vial when the latter is mounted to or received by the vial seat. The pierceable covers of the first and second vials can take the form of respective septa of the vials, or more in general of rubber stoppers. The puncturing members can take the form of hollow spikes, for instance integral with the transfer conduit opening on the interior of the vials.

Preferably, one of the puncturing members of the transfer conduit is arranged to end in, or adjacent to, the pierceable cover of the first vial, when the first vial is received in the first vial seat. Thus, it allows that all the liquid to be transferred from the first vial can be efficiently collected and transferred to the second vial.

Preferably, the support body is arranged such that the first vial seat receives the first vial above the second vial seat receiving the second vial, when the dome portion being activated. Therefore, the vial seats are designed on the support body so that the first vial comes to be located in an upper position and the second vial comes to be located in a lower position relative to each other, when the dome portion being activated. This way, the pumping action of the dome portion in cooperation with the air contained in the chamber is complemented by the action of gravity, which enhances the tendency of the liquid to transfer from the first vial to the second vial through the transfer conduit.

Preferably, the transfer device is configured so that compression of the activation of the dome portion causes air to be delivered into the first vial by the air flow whereas re-expansion of the activation of the dome portion (i.e. when the dome portions goes back to its original shape, for instance by removal of finger pressure) causes the liquid to be drawn from the first vial and to be delivered, through the transfer conduit, to the second vial.

In this case, preferably re-expansion of the dome portion causes air to be drawn from the second vial and delivered to the chamber. Thus, a beneficial equalization of pressure between the vials and the chamber can be achieved.

In an embodiment where the conduit is suitable to convey both liquid and air, the configuration of the transfer device according to the present invention can be such that the transfer conduit comprises a first transfer conduit portion arranged to create a first air flow pathway between the interior of the first vial and the chamber, for delivering the air from the chamber into the first vial, when the first vial is received in the first vial seat.

In addition to that, the transfer conduit can further comprise a second transfer conduit portion arranged to create a second air flow pathway between the interior of the second vial and the chamber, for drawing the air from the second vial to the chamber, when the second vial is received in the second vial seat.

Moreover, the first transfer conduit portion together with the second transfer conduit portion can be arranged to create a liquid flow pathway between the interior of the first vial and the interior of the second vial for the liquid being transferred from the interior of the first vial to the interior of the second vial, when the first vial is received in the first vial seat and the second vial is received in the second vial seat.

When, as above described, the transfer conduit is suitable to convey both air for the air flow and the liquid to be transferred through at least one same segment of a conduit portion, the transfer conduit is preferably further defined by a filter positioned across a recess of the chamber. Thus, the transfer device can comprise a filter member separating the chamber from the transfer conduit. Such filter member is designed to prevent the liquid from passing in the direction of the dome portion and is therefore preferably air-permeable and liquid-tight. In order to repel and not allow liquid passage, the filter member can be made hydrophobic. It can be embodied as a membrane like filter.

Alternatively, a filter-less version of a transfer device can be designed, also when the transfer conduit is suitable to convey both air and liquid. This is especially possible when the chamber comprises a bottleneck portion connected to the transfer conduit and dimensioned for a substantially lossless transfer of the liquid from the first vial to the second vial through the transfer conduit. In this case, even without interposition of a physical barrier to the liquid separating the chamber from the transfer conduit, liquid losses can be minimized by the smallness of the passage between chamber and transfer conduit. The bottleneck portion can be shaped to enhance the effectiveness of the air flow creation and reinforce its strength. By way of example, the bottleneck portion—or, alternatively, the chamber or part thereof—can be tapered, or funnel-shaped or nozzle-shaped.

Preferably, the first transfer conduit portion and the second transfer conduit portion are aligned, for instance axially aligned, and positioned on opposite sides of the chamber.

In a different embodiment, the transfer conduit can form a liquid communication channel extending between the first vial and the second vial. In this configuration, an air-tight and liquid-tight separation wall can be provided between the transfer conduit and the chamber. Thus, the transfer conduit is preferably configured solely for the passage of the liquid drawn from the first vial and transferred to the second vial, whereas the air flow created by the dome portion is established with the first and the second vials through distinct, dedicated air ducts.

In fact, the transfer device can be provided with a first air duct configured to create an air flow pathway between the interior of the first vial and the chamber, particularly for the air delivered into the first vial when the dome portion is activated by compression.

Preferably, the transfer device can comprise means for regulating the flow of the air delivered into the first vial. In particular, the transfer device can comprise a one-way valve arranged to allow air to be delivered from the chamber into the first vial and to prevent air from being delivered from the first vial into the chamber, when the first vial is received in the first vial seat.

Moreover, the transfer device can be provided with a second air duct, configured to create an air flow pathway between the interior of the second vial to the chamber, particularly for air drawn from the second vial for equalization of pressure.

In particular, the transfer device can comprise a one-way valve arranged to prevent air from being delivered from the chamber into the second vial and to allow, instead, air to be delivered from the second vial into the chamber, when the second vial is received in the second vial seat.

The first air duct and the second air duct may be aligned, for instance axially aligned, and positioned on opposite sides of the chamber.

Preferably, a first puncturing member of the transfer conduit further incorporates a first air flow opening, allowing to establish an air flow communication between the first air duct and the interior of the first vial. Also, preferably, a second puncturing member of the transfer conduit further incorporates a second air flow opening, allowing to establish an air flow communication between the second air duct and the interior of the second vial. In this configuration, the air flow openings come to be adjacent to liquid inlet/outlets of the transfer conduit.

In an embodiment the transfer conduit directly connects the first vial and the second vial, when the first vial is received in the first vial seat and second vial is received in the second vial seat. Such transfer conduit allows for an efficient transfer of liquid between the vials. The transfer device can also comprise a liquid proof and air permeable wall member separating the chamber from the transfer conduit, wherein the transfer conduit connects the first vial and the second vial, when the first vial is received in the first vial seat and second vial is received in the second vial seat.

The present invention also relates to a transfer device system comprising a transfer device as above described, in combination with a first vial received in a first vial seat of the transfer device and a second vial received in a second vial seat of the transfer device.

The liquid contained in the first vial and to be transferred to the second vial may take the form of a re-hydrating or diluent solution and/or of a first liquid medicament component.

The second vial, instead, may initially contain a powdered agent and/or a second liquid medicament component to be mixed with the first liquid medicament component. The second vial may even be initially empty and configured to be filled with a pre-defined dose, or with the entire dose, of liquid from the first vial. Given that the transfer device can be designed so that an activation of the dome portion by a compression and re-expansion delivers exactly a certain amount of liquid from the first vial to the second vial, the transfer device can enable a precise filling of the second, possibly empty vial by a definite, known amount of liquid. Thus, by way of example, in case the first vial is dimensioned to contain 2 millilitres or more of liquid, and any activation of the dome is set to perform a transfer of e.g. 1 millilitre of liquid, the present invention enables an easy and exact partitioning (e.g. halving) of a quantity of liquid in between the first and the second vial.

In any event, by varying the design of the transfer device according to the present invention, the liquid transfer from the first vial to the second vial can be achieved by one single activation of the resilient dome portion or, more preferably, by multiple activations thereof.

In any way, by a planned dimensioning of the device components, such as the dome portion, the chamber and the transfer conduit, the present invention allows an operator to transfer an intended quantity of liquid from a first vial to a second vial, following an active pumping movement imparted to the dome portion, for instance by applying finger pressure thereto.

BRIEF DESCRIPTION OF THE DRAWINGS

The device for transferring a liquid from a first vial to a second vial according to the invention is described in more detail herein below by way of two exemplary embodiments and with reference to the attached drawings, in which.

DESCRIPTION OF EMBODIMENTS

In the following description certain terms may be used for reasons of convenience and are not intended to limit the invention. The terms “right”, “left”, “up”, “down”, “under” and “above” refer to directions in the figures. The terminology comprises the explicitly mentioned terms as well as their derivations and terms with a similar meaning. Also, spatially relative terms, such as “beneath”, “below”, “lower”, “above”, “upper”, “proximal”, “distal”, and the like, may be used to describe one element’s or feature’s relationship to another element or feature as illustrated in the figures. These spatially relative terms are intended to encompass different positions and orientations of the devices in use or operation in addition to the position and orientation shown in the figures. For example, if a device in the figures is turned over, elements described as “below” or “beneath” other elements or features would then be “above” or “over” the other elements or features. Thus, the exemplary term “below” can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
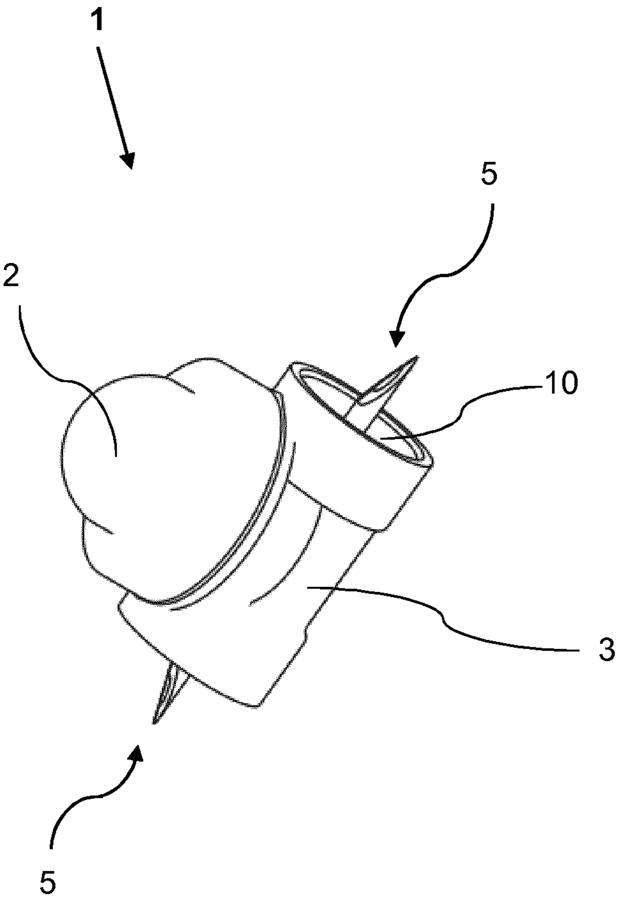
FIG. 1 shows a perspective view of a first embodiment of a transfer device according to the present invention.
Figure 2:
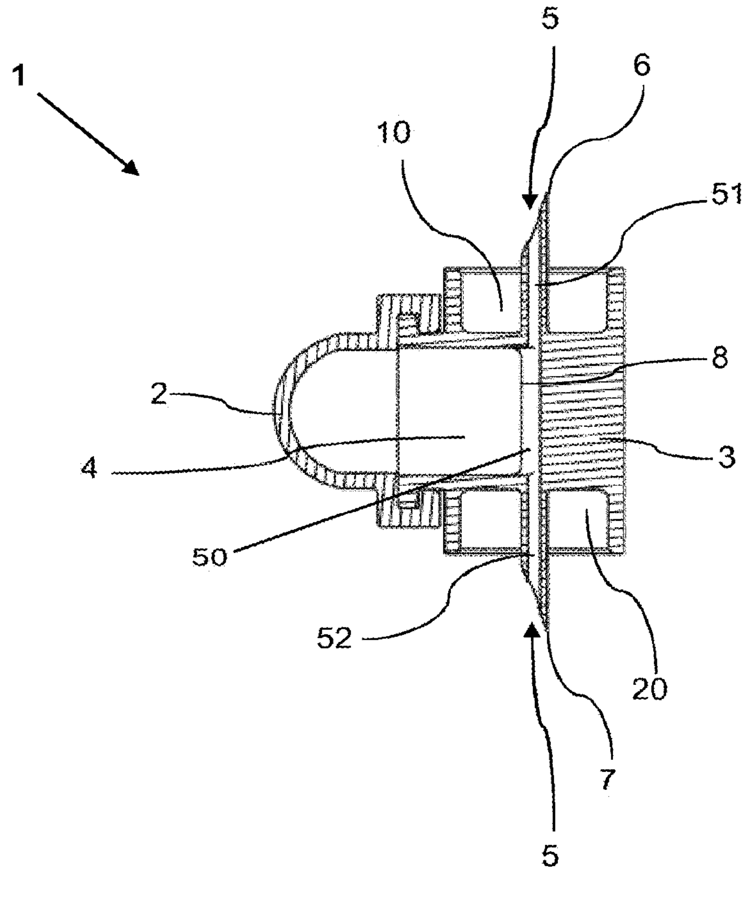
FIG. 2 shows a lateral cross-sectional view of the transfer device of FIG. 1.

Referring to FIGS. 1 and 2, a first embodiment of the transfer device 1 according to the present invention is represented. A resilient dome portion 2, configured to create an air flow when activated by compression and re-expansion, is supported by a support body 3. The resilient dome 2 tightly engages a flange-shaped, or a lip-shaped, protrusion extending at an open end of the support body 3. The support body 3 and the dome portion 2 thus cooperate to form a chamber 4 comprising air which is employed to create the abovementioned air flow on, or upon, activation of the dome 2. The support body 3 comprises a first vial seat 10 arranged to receive a first vial, a second vial seat 20 arranged to receive a second vial, and a transfer conduit 5 connecting the first and second vial seats 10, 20 to establish a fluid communication.

In particular, the transfer conduit 5 is arranged to establish a fluid connection between the first vial 100 and the second vial 200. More specifically, for the specific embodiment represented, the transfer conduit 5 comprises a first transfer conduit portion 51 and a second transfer conduit portion 52, wherein the chamber 4 comprises a bottleneck portion 50 connected to and positioned between the first transfer conduit portion 51 and the second transfer conduit portion 52 of the transfer conduit 5, the bottleneck portion 50 being dimensioned for a substantially lossless transfer of the liquid from the first vial 100 to the second vial 200 through the first transfer conduit portion 51 and the second transfer conduit portion 52 of the transfer conduit 5, as shown in FIGS. 2 and 4.

The transfer conduit 5 is separated from the chamber 4 by a filter 8 or filter member as air permeable and liquid proof wall member.

Figure 3:
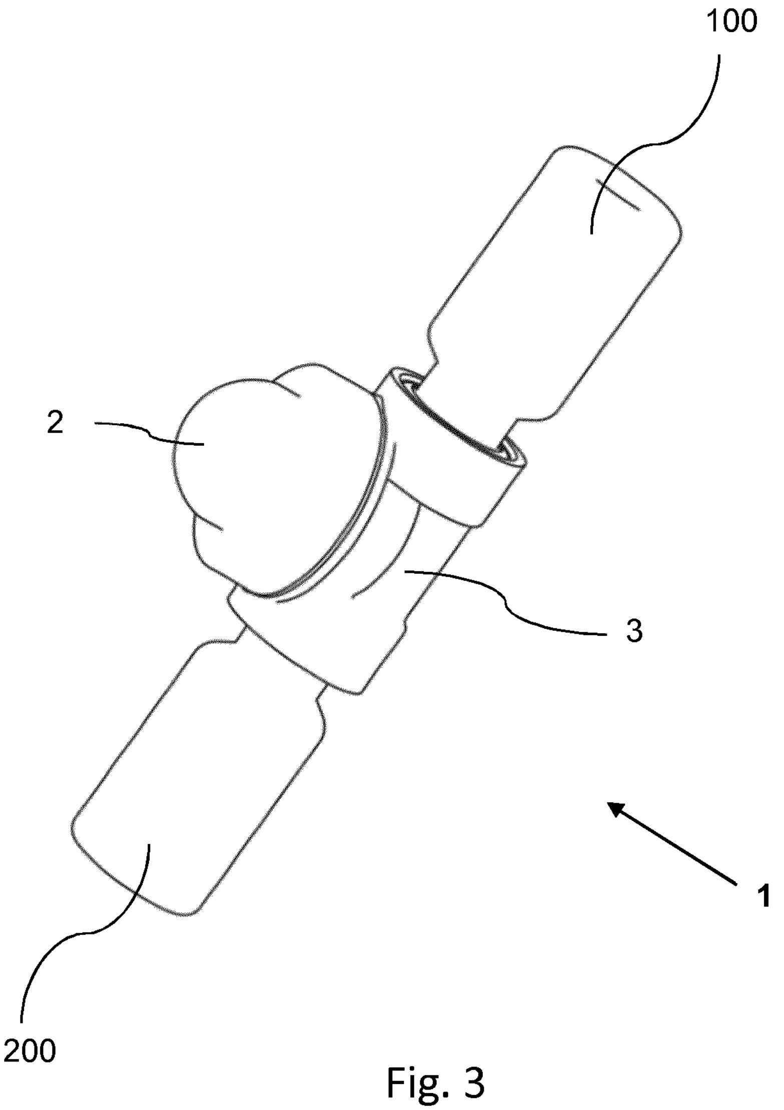
FIG. 3 shows a perspective view of the transfer device of FIG. 1, when a first and a second vial are engaged in respective vial seats of the device.
Figure 4:
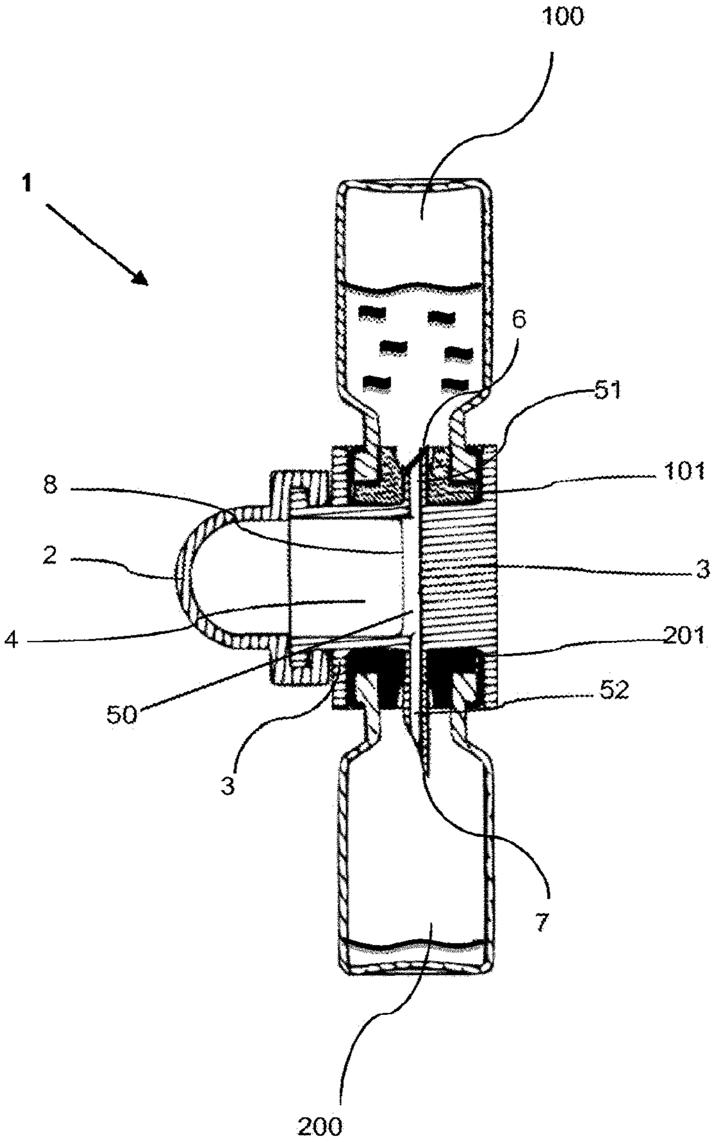
FIG. 4 shows a lateral cross-sectional view of the transfer device of FIG. 3.

FIGS. 3 and 4 show the same transfer device 1 as FIGS. 1 and 2 in an operative configuration, wherein a first vial 100 and a second vial 200 are received in the respective vial seats 10, 20.

On or upon compression of the activation of the dome portion 2, an air flow is created such that air is delivered from the chamber 4 through the filter 8 into the first vial 100 via the first transfer conduit portion 51 and into the second vial 200 via the second transfer conduit portion 52. Thereby, a pressure rise is created in the first vial 100 and in the second vial 200.

When releasing the dome portion 2, the resiliency or elasticity of the material it is made of re-expands the dome portion 2. Thereby, air is withdrawn from the second vial 200 and transferred through the filter 8 into the chamber 4 via the second transfer conduit portion 52. Additionally, liquid is withdrawn from the first vial 100 into the first transfer conduit portion 51. Since the liquid is not transferable through the filter 8, it passes the filter 8 and is transferred into the second vial 200 via the second transfer conduit portion 52. In fact, when the dome portion 2 re-expands, e.g. upon removal of a finger's pressure, and goes back to its original shape, the liquid is drawn from the first vial 100 and conveyed, through the transfer conduit 5, to the second vial 200. Also, when the dome portion 2 re-expands, air is drawn from the second vial 200 and conveyed to the chamber 4 for equalization of pressure between the chamber and the two vials 100, 200 in fluid communication therewith.

Thus, the first transfer conduit portion 51 is arranged to create a first air flow pathway between the chamber 4 and the interior of the first vial 100, for delivering air from the chamber 4 into the first vial 100. It further is arranged to establish a liquid flow pathway from the first vial 100 towards the second vial 200.

The second transfer conduit portion 52, instead, is arranged to create a second air flow pathway between the interior of the second vial 200 and the chamber 4, for delivering air from the chamber 4 into the second vial 200 and for drawing air from the second vial 200 into the chamber 4. Further to that, the second transfer conduit portion 52 is arranged to establish a liquid flow pathway together with the first transfer conduit portion 51 between the interior of the first vial 100 and the interior of the second vial 200 for the liquid to be transferred, when the transfer device 1 is in the operative configuration, that is when the first vial 100 is received in the first vial seat 10 and the second vial 200 is received in the second vial seat 20.

The same transfer conduit portions 51 and 52 are therefore adapted to convey both an air flow and liquid, in respective phases of the overall liquid transfer procedure. The first transfer conduit portion 51 and the second transfer conduit portion 52 are aligned, namely axially aligned, and positioned on opposite sides of the chamber 4. An end section of the transfer conduit portion 51 protrudes in the first vial seat 10 with puncturing member 6, in the form of a hollow spike, to establish a fluid flow pathway to and/or from the interior of the first vial 100, through a septum 101 of the vial 100. An end section of the transfer conduit portion 52 protrudes in the second vial seat 20 with puncturing member 7, also in the form of a hollow spike, to establish a fluid flow pathway to and/or from the interior of the second vial 200, through a septum 201 of the vial 200.

In an alternative variant of the device 1, no filter 8 is provided between the transfer conduit 5 and the chamber 4. In operation of this variant, compressing the dome portion 2 within activation results in a transfer of air from the chamber 4 into the first vial 100 and into the second vial 200. Like this, an overpressure is generated in the first vial 100 and the second vial 200. When releasing and thereby resiliency induced re-expanding the dome portion 2 within activation, the overpressure is equalized by drawing liquid from the first vial 100 into the chamber 4 and air from the second vial 200 into the chamber 4. Each subsequent compression pressurises the first and second vials 100, 200 again. In particular, this achieved by forcing air from the chamber 4 into the first vial 100 and by forcing the liquid, eventually accompanied by some air, from the chamber 4 into the second vial 200. Each subsequent release equalizes the pressure in the first and second vials 100, 200 by drawing liquid from the first vial 100 and air from the second vial 200.

Figure 5:
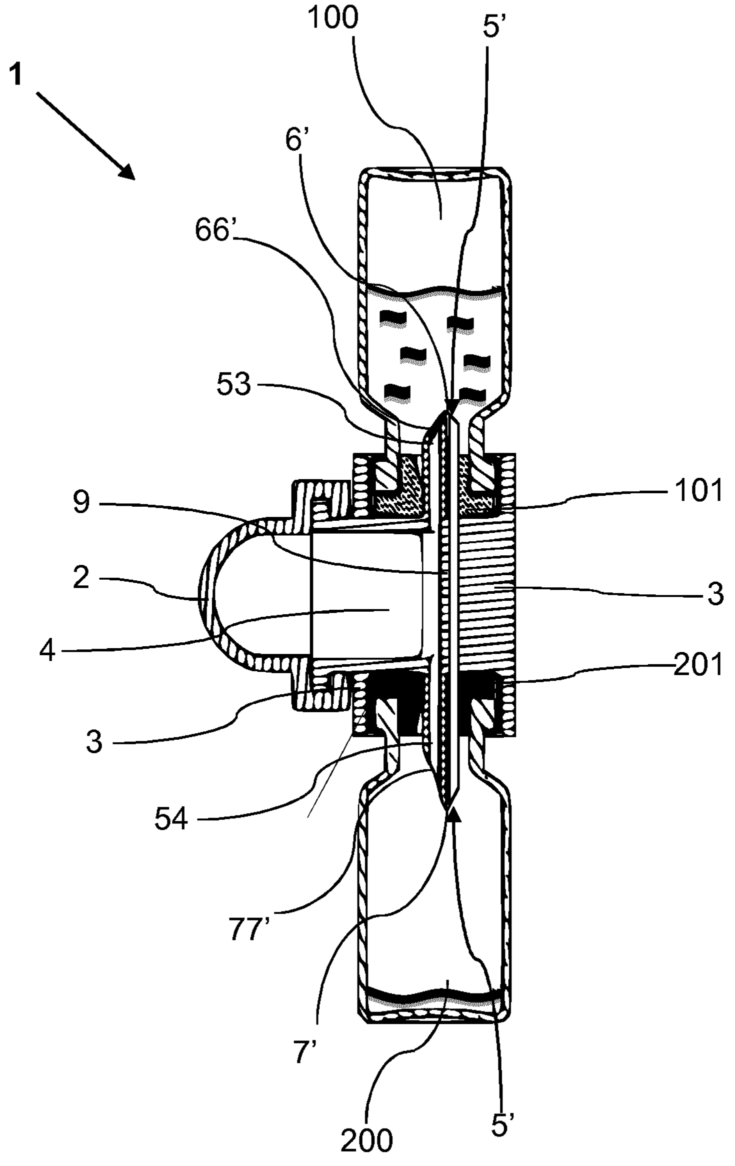
FIG. 5 shows a lateral cross-sectional view of a second embodiment of a transfer device according to the present invention, when a first and a second vial are engaged in respective vial seats of the device.

In a different embodiment, represented in FIG. 5, the fluid flow established between the chamber and the vials, as well as between the vials themselves, in order to produce the liquid transfer from a first vial 100 to a second vial 200 is differently engineered. The transfer device 1 comprises a transfer conduit 5' forming a liquid communication channel stretching between the first vial 100 and the second vial 200. In this case, differently from the embodiment of FIGS. 1-4, an air-tight and liquid-tight separation wall 9 is provided between the transfer conduit 5' and the chamber 4. Thus, relative to this specific case, the transfer conduit 5' is configured solely for the passage of the liquid drawn from the first vial 100 and to be transferred to the second vial 200.

The air flow created by the activation of the dome portion 2 and triggering the liquid transfer is, instead, conveyed through distinct, dedicated air ducts 53, 54.

In fact, the transfer device of FIG. 5 comprises a first air duct 53 configured to create an air flow pathway between the interior of the first vial 100 and the chamber 4. Through this first air duct 53 passes the air delivered into the first vial 100 by the air flow, for instance as a result of a compression of the dome portion 2.

The air flow direction may be controlled by a one-way valve regulating the flow of the air pushed into the first vial 100. In particular, a one-way valve may be arranged to allow air to be delivered from the chamber 4 into the first vial 100 and, at the same time, to prevent air circulation in the opposite sense, i.e. to prevent air from being delivered from the first vial 100 into the chamber 4.

A second air duct 54 is configured to create an air flow pathway between the interior of the second vial 200 and the chamber 4. Through this second air duct 54 passes the air drawn from the second vial 200 into the chamber 4, for equalization of pressure. Analogously to the air duct portion previously introduced, a one-way valve may be provided to regulate the flow of the air drawn from the interior of the second vial 200. Thus, a one-way valve can be arranged to prevent air from being delivered in the opposite sense, from the chamber 4 into the second vial 200.

For simplicity of design and efficiency in air flow creation, the first air duct 53 and the second air duct 54 are aligned and positioned on opposite sides of the chamber 4.

The transfer conduit 5' comprises end sections each embodied as puncturing members 6', 7'.

In analogy to the embodiment of FIGS. 1-4, a first end section of the transfer conduit 5' protrudes in the first vial seat 10 with puncturing member 6', in the form of a hollow spike, to establish a liquid flow pathway from the interior of the first vial 100, through septum 101; and a second end section of the transfer conduit 5' protrudes in the second vial seat 20 with puncturing member 7', also in the form of a hollow spike, to establish a liquid flow pathway to the interior of the second vial 200, through septum 201.

In addition to that, the first puncturing member 6' of the transfer conduit 5' further incorporates a first air flow opening 66', allowing to establish an air flow communication between the first air duct 53 and the interior of the first vial 100. The second puncturing member 7' of the transfer conduit 5' further incorporates a second air flow opening 77', allowing to establish an air flow communication between the second air duct 54 and the interior of the second vial 200. In this configuration, the air flow openings 66', 77' come to be adjacent to respective liquid inlet/outlets of the transfer conduit 5'.

This description and the accompanying drawings that illustrate aspects and embodiments of the present invention should not be taken as limiting the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word “comprising” does not exclude other elements or steps, and the indefinite article “a” or “an” does not exclude a plurality. A single unit or step may fulfil the functions of several features recited in the claims. The mere fact that certain measures are recited in mutually different dependent claims does not indicate that a combination of these measures cannot be used to advantage. The terms “essentially”, “about”, “approximately” and the like in connection with an attribute or a value particularly also define exactly the attribute or exactly the value, respectively. The term “about” in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A transfer device for transferring a liquid from a first vial to a second vial, comprising:

a resilient dome portion configured to create an air flow when activated by compression and re-expansion; and a support body tightly supporting the resilient dome portion to form a chamber comprising air for the air flow, the support body comprising a first vial seat, a second vial seat and a transfer conduit, wherein the first vial seat of the support body is arranged to receive the first vial, the second vial seat of the support body is arranged to receive the second vial, and the transfer conduit comprises end sections each embodied as puncturing members protruding from the first and second vial seats and arranged to establish flow pathways to and/or from an interior of the first vial through a pierceable cover of the first vial and to and/or from an interior of the second vial through a pierceable cover of the second vial, and wherein when the first vial is received in the first vial seat and the second vial is received in the second vial seat, one of the puncturing members of the transfer conduit is arranged to end in the pierceable cover of the first vial, the transfer conduit is arranged to establish a fluid connection between the first vial and the second vial, and on activation of the resilient dome portion, air is delivered into the first vial by the air flow, creating a pressure rise in the first vial which causes the liquid to transfer from the first vial to the second vial through the transfer conduit, wherein the transfer conduit comprises a first transfer conduit portion and a second transfer conduit portion, wherein the first transfer conduit portion is arranged to create a first air flow pathway between the interior of the first vial and the chamber for delivering the air from the chamber into the first vial, when the first vial is received in the first vial seat, wherein the second transfer conduit portion is arranged to create a second air flow pathway between the interior of the second vial and the chamber for drawing the air from the second vial to the chamber, when the second vial is received in the second vial seat, wherein the first transfer conduit portion together with the second transfer conduit portion are arranged to create a liquid flow pathway between the interior of the first vial and the interior of the second vial for the liquid being transferred from the first vial to the second vial, when the first vial is received in the first vial seat and the second vial is received in the second vial seat, and wherein the chamber comprises a bottleneck portion fluidly connected to, and fluidly positioned between, the first transfer conduit portion and the second transfer conduit portion of the transfer conduit, the bottleneck portion being dimensioned for a substantially lossless transfer of the liquid from the first vial via the first transfer conduit portion into the second vial via the second transfer conduit portion.

2. The transfer device of claim 1, wherein the support body is arranged such that the first vial seat receives the first vial above the second vial seat receiving the second vial, when the resilient dome portion is activated.

3. The transfer device of claim 1, wherein the transfer device is configured so that:

activation of the resilient dome portion by compression of the resilient dome portion causes air to be delivered into the first vial by the air flow, and activation of the resilient dome portion by re-expansion of the resilient dome portion causes the liquid to be drawn from the first vial and to be delivered through the transfer conduit to the second vial.

4. The transfer device of claim 3, wherein the transfer device is configured so that activation of the resilient dome portion by re-expansion of the dome portion causes air to be drawn from the second vial and delivered to the chamber.

5. The transfer device of claim 1, comprising a filter member separating the chamber from the transfer conduit, wherein the filter is air-permeable and liquid tight.

6. The transfer device of claim 1, wherein the first transfer conduit portion and the second transfer conduit portion are aligned and positioned on opposite sides of the chamber.

7. The transfer device of claim 1, wherein the transfer conduit connects the first vial, the second vial and the chamber, when the first vial is received in the first vial seat and second vial is received in the second vial seat, such that the first vial, the second vial and the chamber are in fluid communication.

8. The transfer device of claim 1, wherein the transfer conduit directly connects the first vial and the second vial, when the first vial is received in the first vial seat and second vial is received in the second vial seat.

9. The transfer device of claim 1, wherein the resilient dome portion is made of a flexible elastomeric material such as silicone.

10. A transfer device system comprising a transfer device according to claim 1, a first vial and a second vial.

11. The transfer device system of claim 10, wherein the first vial comprises a liquid re-hydrating or diluent solution and/or a first liquid medicament component, and/or wherein the second vial comprises a powdered agent and/or a second liquid medicament component or is initially empty.

* * * * *